Oct. 8, 1940.   E. J. ABBOTT   2,216,725
WINDING MACHINE
Filed Aug. 24, 1936   5 Sheets-Sheet 1

Inventor
Edward J. Abbott
by Roberts, Cushman + Woodbury
Att'ys.

Oct. 8, 1940.  E. J. ABBOTT  2,216,725

WINDING MACHINE

Filed Aug. 24, 1936  5 Sheets-Sheet 2

Fig. 2

Inventor
Edward J. Abbott
by Roberts, Cushman & Woodbury
att'ys

Oct. 8, 1940.　　　　E. J. ABBOTT　　　　2,216,725
WINDING MACHINE
Filed Aug. 24, 1936　　　　5 Sheets-Sheet 3

Inventor
Edward J. Abbott
by Roberts, Cushman & Woodbury,
attys.

Oct. 8, 1940.  E. J. ABBOTT  2,216,725
WINDING MACHINE
Filed Aug. 24, 1936  5 Sheets-Sheet 4

Inventor
Edward J. Abbott
by Roberts, Cushman & Woodbury
Attys.

Oct. 8, 1940.  E. J. ABBOTT  2,216,725
WINDING MACHINE
Filed Aug. 24, 1936  5 Sheets-Sheet 5

Inventor
Edward J. Abbott
by Roberts, Cushman & Woodberry
Attys

Patented Oct. 8, 1940

2,216,725

UNITED STATES PATENT OFFICE 2,216,725

WINDING MACHINE

Edward J. Abbott, Wilton, N. H., assignor to Abbott Machine Company, Wilton, N. H., a corporation of New Hampshire Application August 24, 1936, Serial No. 97,510

25 Claims. (Cl. 242—35.5)

This invention relates to winding and similar machines which act to wind packages of textile yarn and the like, and is of particular applicability to traveling spindle winders of the general type described in the United States patents to Edward J. Abbott Nos. 1,609,639 and 1,993,910. Among the objects of the invention are to provide an improved construction of traverse device, to provide improved lubricating means for the package-driving roll, to provide for greater winding speed, and to improve the winding of conical packages on traveling spindle winders by making provision for a loose ring or analogous element under the tip of the cone. Further objects of invention are to provide improved mechanism capable of use in a traveling spindle winder for breaking up the tendency to form ribbon-wind, to provide an improved driving mechanism for the package-driving rolls of the winding units, and to provide an improved conveying mechanism for causing the winding units to travel.

Other objects of invention and features of advantage and novelty will be apparent from this specification and its drawings wherein the invention is explained by way of example.

In the drawings

Fig. 1ª is a diagrammatic plan view of an end portion of a traveling unit winding machine, showing several of the flexibly-connected traveling winding units and portions of the straight and curved path of travel thereof, the remaining winding units being omitted for simplicity of illustration.

Figs. 7 to 19 inclusive illustrate alternate forms of driving and ribbon-breaking devices applicable to the winding unit of Figs. 1 to 4;

Figure 2:
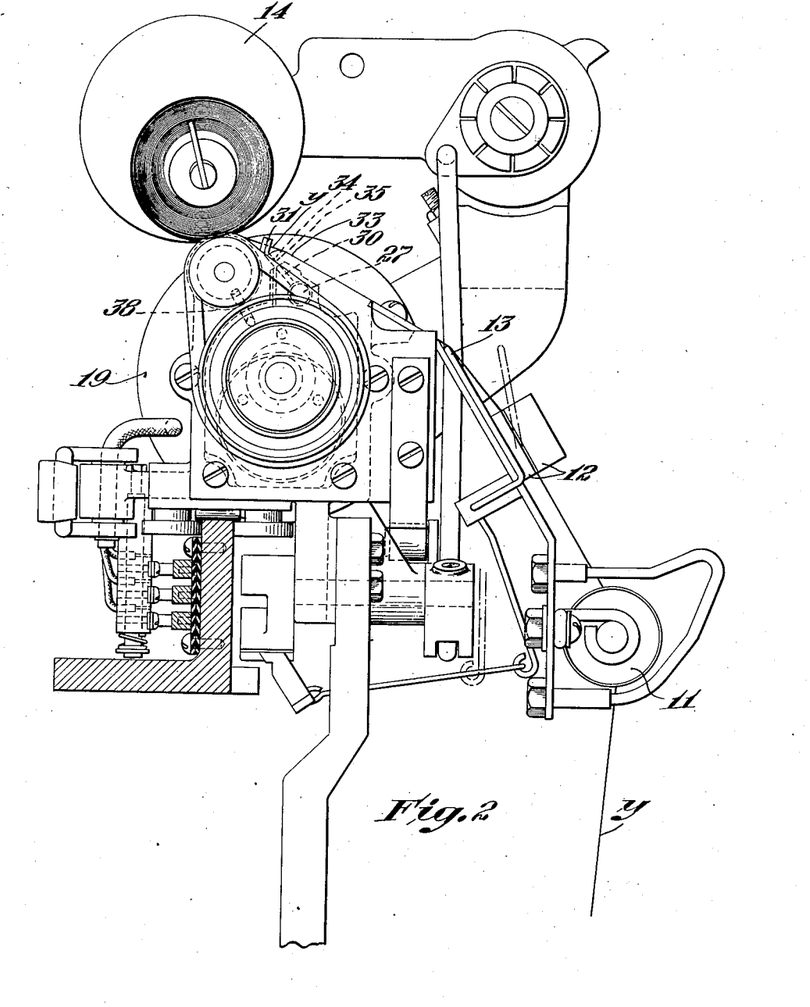
Fig. 2 is a left end elevation of the unit of Fig. 1, showing the unit on a section of the track of a traveling spindle winding machine.

For simplicity of illustration, the lower part of the winding unit, which can have the form of any of those shown in the above-mentioned Abbott patents, is omitted from the drawings, it being understood that the winding unit of this application has a suitable bobbin holder from which yarn y runs to the tension device 11, slubcatcher 12 and over the detector wire 13 (Fig. 2) to the winding package 14.

Figures 1, 5, 6:
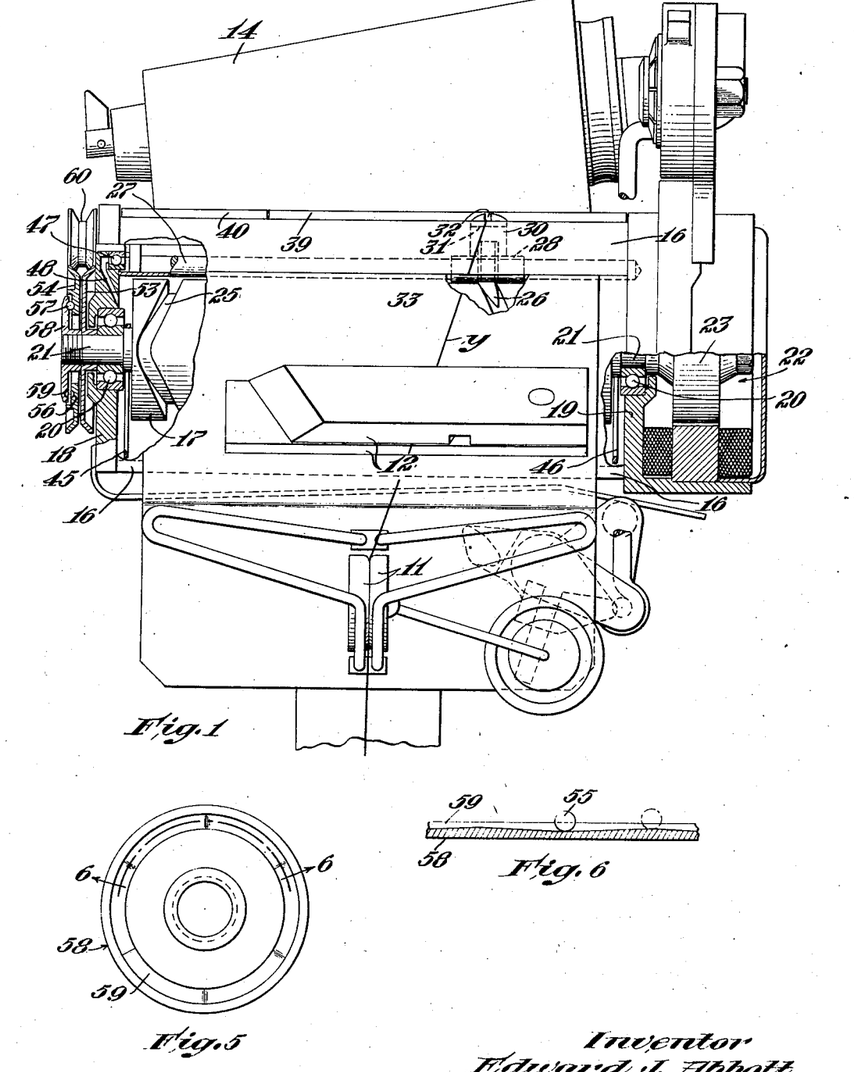
Fig. 1 is a front elevation of the upper or head portion of a winding unit according to this invention, parts of the unit being removed and broken away for clarity of illustration.
Fig. 5 is a detail of a part of the driving and ribbon-breaking mechanism of the unit of Fig. 1, this Fig. 5 comprising an elevation of the inner face of the cap on the left end of the traverse cam shaft.
Fig. 6 is a fragmentary section on the line 6—6 of Fig. 5, showing the contour of the ball groove in the cap of Fig. 5.

The head portion of the winding unit is formed essentially as a closed casing comprising a hollow casing 16 enclosing the traverse cam 17. As indicated in Fig. 1, the casing 16 is closed at its left side by a plate 18 and at its right side by the plate-like side of a motor housing 19, each of which carries a ball bearing mounting 20 for the shaft 21 of the traverse cam. An electric motor 22 preferably of the three-phase type is contained in the motor housing 19 and has its armature 23 fast on the traverse cam shaft 21.

The traverse cam 17 is preferably of the construction described in the copending United States patent application of Edward J. Abbott, Serial No. 506,530, filed January 5, 1931, that is, an essentially solid roll of steel, case-hardened in the region of its grooves 25, which latter cross and create a quick-traverse motion of a cam follower 26.

A round rod 27, near the periphery of cam 17, defines the path of travel of a slider 28 to which the cam follower 26 is pivoted. Slider 28 carries an extension 30 which is bent upwardly at 31 and notched at 32 to receive the yarn y which runs over the upper face 33 of the casing. The upper portion of the casing is provided with an accurately finished lower surface 34 which constitutes one guide surface for the extension 30 of the slider, and a parallel accurately finished surface 35 of the casing constitutes another guide surface for the extension 30 of the slider 28. These guide surfaces, which are the opposite walls of a slot, prevent the slider from turning around its rod 27.

The outer surface of casing 16 is provided with a concavity 38 approximately corresponding to the peripheral curvature of a package-driving roll 39 of small diameter, for example 3/4 inch, this construction permitting the nip between the package 14 and the package drive roll 39 to be very close to the path of reciprocation of the traverse guide 31.

The opposite end portions of roll 39 are received in ball bearings 40 carried by the end plate 18 and motor housing 19.

Although the present invention is applicable to winding cylindrical packages of yarn, it is shown in its preferred embodiment as constructed to wind conical packages. Thus the cam 17 preferably has its groove 25 formed with an accelerated taper at the left end, to increase the conicity of the package as it grows.

In the past, in winding cones on traveling spindle winders the construction of the machine has been such as to apply rotary driving force to the entire length of the cone. For example, in rotating the traveling cone by the friction of a long tractor roll along which the cone is slid, the tractor roll touches and rotates in contact with both the tip and the base portions of the cone. However, it is preferable that the tip portion of a winding cone be not frictionally driven, since if driving contact be had with the entire length of cone the tip portion of the rotating cone will constantly slip backwards with respect to the rotating drive roll because the surface speed of the small tip portion of the cone is necessarily slower than those of the larger middle and base portions.

In the illustrated machine, this problem of driving a cone in a traveling spindle winder is satisfactorily met by providing the package driving roll 39 with a loose ring portion 40 thereon at the left end of the roll 39 where the tip part of the cone lies. Ball bearings 41, 42 (Fig. 3), carried by roll 39, in turn carry the loose ring portion 40, permitting free rotation of the roll 39 with relation to the ring portion 40. Rubbing of the tip part of the cone by the drive roll is thus avoided.

The casing 16, which is substantially closed except for the slit in which the traversing yarn guide 31 runs, serves as an oil reservoir for lubricating all of the high speed parts of the traversing and package-driving mechanism. Oil rings 45 and 46 (Fig. 1) carry oil from the bottom of the casing up into the region of ball bearings 20, 21 which carry the load of the cam and motor, and the rotation of the oil rings and cam also throws finely divided oil onto all the parts of the cam 25, guide rod 27 and slider 28 that are subjected to friction. The ball bearings 47 at both ends of the package-driving roll 39 also receive a spray or mist of oil from the casing by means of oil conduits leading from the interior of the casing 16 to these bearings, one such conduit being indicated at 48 in Fig. 1. The improved lubrication of the high-speed driving parts of the device, is of substantial assistance in enabling the winding unit to be run smoothly and quietly at very high winding speeds such as 1000 yards per minute. An oil-filling cup 50 and conduit 51 connecting the cup to the casing, permit the latter to be supplied with oil in a convenient manner.

Figure 1A:
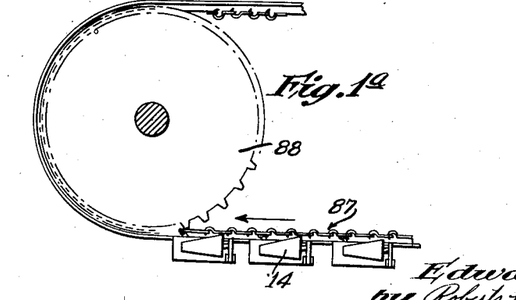

Each of the several winding units of the machine is connected by a suitable bracket 85 and pivot pin 86 to a link of a chain 87 which is shown in Fig. 1a is common to all of the units and runs in an endless path around the machine on two sprockets 88, one of which is driven. Heretofore, in order to compensate for the eventual wear in the chain, it has been necessary to remove one or more links from the chain (which required a new machine initially to have extra odd links in the chain and hence an undesirable marked inequality of spacing of the winding units tending to disrupt the timing of any automatic device which it might be desired to have operate on the units in synchronism with the chain movement) or else it has been necessary to shift the axis of one or both of the chain sprockets to tighten the chain (which had the effect of undesirably rendering one or both sprockets non-concentric with its adjacent semi-circular track portion of the machine).

Figure 3:
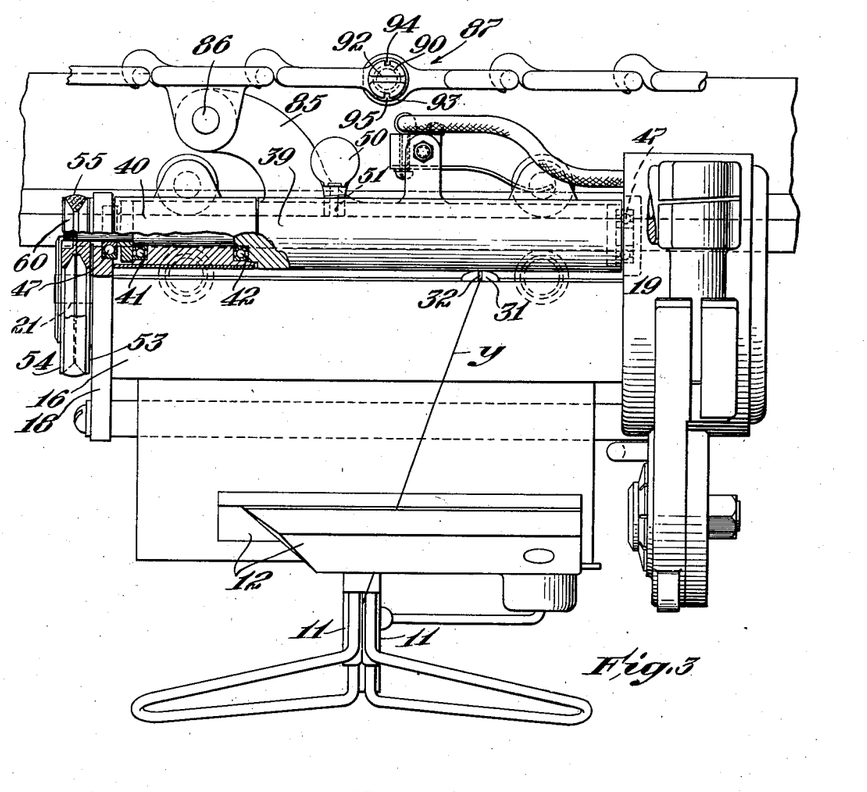
Fig. 3 is a plan view of the unit of Figs. 1 and 2, with certain additional parts broken away.
Figure 4:
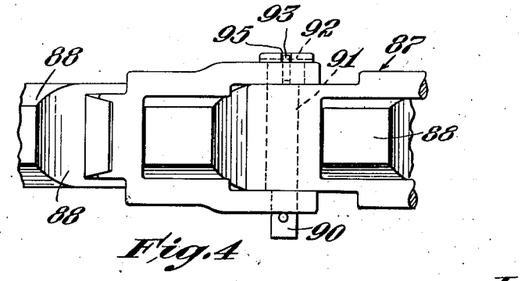
Fig. 4 is a fragmentary side elevation, showing a portion of the winding unit conveying chain and one of its sprockets.

The present invention avoids these difficulties by providing the chain with a plurality of adjustable link pins, preferably spaced at intervals around the endless chain, so that by adjustment of the several adjustable link pins or so many of them as is necessary, the chain can be kept tight without shifting the axes of the sprockets or introducing any marked differences between the spacing of the winding units on the chain. Referring to Figs. 3 and 4, each of the adjustable link pins 90 is rotatable in the upper and lower forks of the link in which it is mounted, and has an eccentric middle portion 91 which engages the next adjacent link. Each pin 90 can be rotated by means of a screw driver, the head being slotted at 92 for this purpose, and the chain thus tightened. A detachable pin 93 fitting in a corresponding hole in the link, is adapted to engage any one of a plurality of recesses in the head of the pin, such as indicated at 94 and 95, thereby to hold the pin in its adjusted position.

Heretofore in traveling spindle winding machines provision has been made for breaking up the phenomena of "ribbon wind" by providing a special form of drive from the non-traveling portion of the machine to the traverse device. Thus in a United States patent application of Edward J. Abbott, Serial No. 476,776, filed August 21, 1930, there is disclosed a specially shaped tractor roll which drives the traverse devices at varying speeds, as the traverse devices move along said roll. The present invention provides a new form of ribbon-breaking mechanism of sufficiently simple and compact form to be made a part of each winding unit of a multiple unit winding machine, and permit the traverse devices of the several units to be independent of any special form of drive from the non-traveling portion of the machine.

In the several embodiments of this new ribbon-breaking device, there is provided a driving connection comprising cooperating frictional driving and driven elements, which thus introduces a slip between the driving and the driven element. The slip or differential motion between these elements is then employed to provide a relatively slow variation of the ratio between the traverse cam speed and the winding package drive roll speed. Preferably, for simplicity, either one or both of the aforesaid frictional driving and driven elements which introduce the slip constitutes a part of or is associated with the driving connection between the cam and package roll.

Referring particularly to Figs. 1 and 3, the shaft 21 of the traverse cam carries fast thereon the right half 53 of a split V-shaped pulley, this right half pulley being suitably detachably keyed or otherwise detachably secured to shaft 21. The left half 54 of the pulley is loose but is continually forced to the left by the action of the V-shaped belt 55 running thereon. The left half 54 of the pulley is provided with a groove 56 which receives ball bearings 57 spaced apart at say 120° by any simple wire spacer. A cap 58 (Figs. 1, 5 and 6) fast on shaft 21, (but detachable by unscrewing) is likewise grooved at 59 to receive the spaced balls 57. The contour of the groove 59 is curved with high points 120° apart and intermediate low points, as shown in Figs. 5 and 6, so that movement of the series of balls 57 along the circular groove 59 alternately forces the balls 57 and loose half 54 of the pulley to the right (as the balls ride on the high parts of the groove) and then allows them to return to the left under the influence of the wedging action of the belt 55.

The V-belt 55 is frictionally driven by the tight half 53 of the pulley and in turn drives a small pulley 60 on the shaft of the package drive roll. There is a continual slight slippage between the tight half 53 of the pulley and the belt 55, and accordingly the loose half 54 of the pulley is driven by the belt at a slightly slower speed than that of the tight half 53, cam shaft 21 and cap 58. The resulting differential movement between the loose half 54 of the pulley and the cap 58 causes the balls 57 alternately to ride upon the high points and then the low points of the ball groove 59 in cap 21, with the result that the loose half 54 is alternately forced toward the tight half 53 and then allowed to move away from the tight half. When the halves of the pulley are closest together, the effective diameter of the driving pulley is largest and when the halves of the pulley are farthest apart the effective diameter of this pulley is smallest. This continual change in the effective diameter of the pulley slightly varies the speed of the belt 55, driven pulley 60 and package drive roll 39 with respect to the traverse cam and so breaks up ribbon wind.

Figure 7:
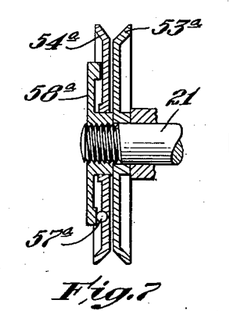
Fig. 7 is a vertical sectional view of an alternate form of driving pulley.
Figure 8:
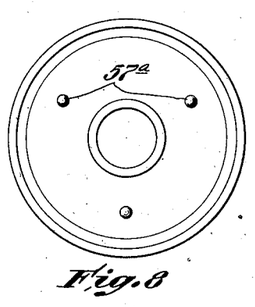
Fig. 8 is a left elevation of the left one of the two halves of the pulley of Fig. 7.
Figure 9:
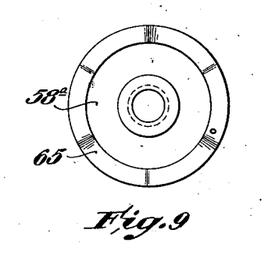
Fig. 9 is a right elevation of the cap of Fig. 7.

In the modification of Figs. 7, 8 and 9, the tight pulley half 53ᵃ is arranged in the same manner as pulley half 53 of the embodiment of Figs. 1 to 6. Pulley half 54ᵃ is mounted to turn loosely on the hub of the cap element 58ᵃ. Instead of cap 58ᵃ being grooved for the reception of ball elements as described in connection with Figs. 5 and 6, this cap 58ᵃ is formed with a cam-like surface 65 (Fig. 9) having high and low points spaced similarly to those of the bottom of the groove 59 of the cap 58 of Figs. 5 and 6. A series of balls 57ᵃ tightly embedded in the left half pulley 54ᵃ slide in contact with the cam-like surface 65 and contact alternately with the high and low portions thereof, thus producing an axial movement of the left half 54ᵃ toward and from the right half. The V belt, which can be the same as belt 55 is thus driven at continually varying speeds.

Figures 10, 11:
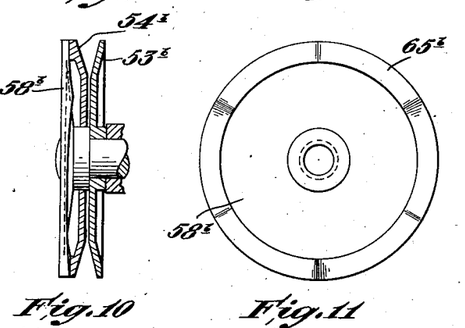
Fig. 10 is a vertical sectional view of a further alternate form of driving pulley.
Fig. 11 is a left elevation of the left one of the two halves of the pulley of Fig. 10.
Figure 12:
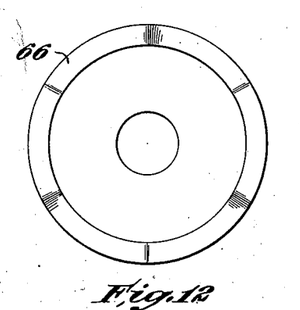
Fig. 12 is a right elevation of the cap of Fig. 10.

The modification of Figs. 10, 11 and 12 is generally similar to that of Figs. 7, 8 and 9 but differs therefrom in that the detachable cap 58ᵇ is extended to the diameter of the left pulley half 54ᵇ and that instead of the left pulley half carrying balls 57ᵃ, as in Figs. 7 to 9, the left pulley half 54ᵇ carries on its left face a cam surface 66 similar to the cam surface 65ᵇ on the cap. In this case the relative movement between the left loose half 54ᵇ and the cap element 58ᵇ causes the high points on the cam surface 66 to contact alternately with the low points on the cam surface 65ᵇ and then with high points on the latter cam surface, with the effect of continually varying the effective diameter of the pulley and hence the speed of the belt 55.

Figure 13:
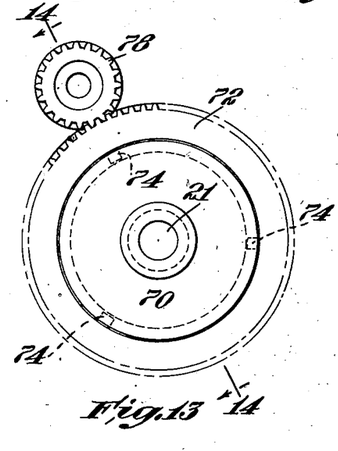
Fig. 13 is a left elevation of an alternate form of connection between the traverse cam and the package-driving roll.
Figure 14:
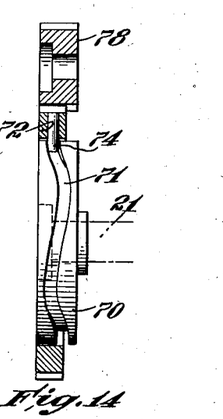
Fig. 14 is a sectional view on the line 14—14 of Fig. 13.
Figure 15:
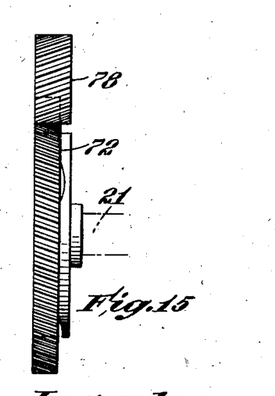
Fig. 15 is a view of the elements of Fig. 13 from the front of the winding unit.
Figure 16:
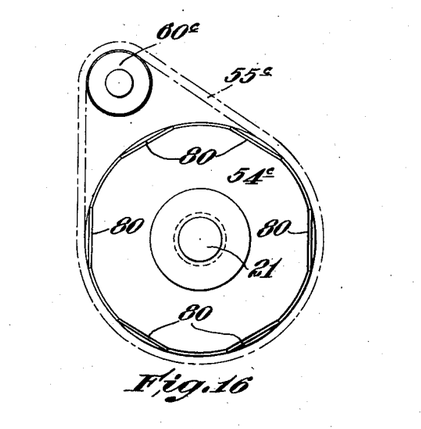
Fig. 16 is a left elevation of a further alternate form of connection between the traverse cam and the package-driving roll.
Figure 17:
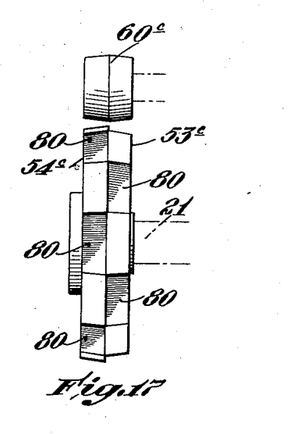
Fig. 17 is a view of the elements of Fig. 16 from the front of the winding unit, with the belt removed, showing particularly the two halves of the driving pulley.
Figure 18:
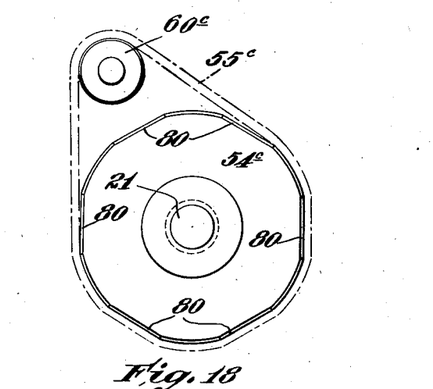
Fig. 18 is a left elevation of the elements of Fig. 16, with the two halves of the driving pulley in a different relative position.
Figure 19:
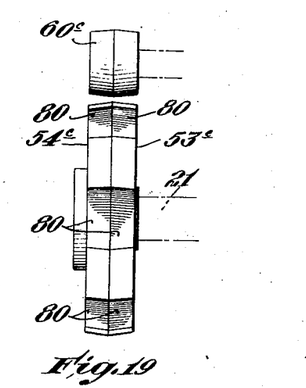
Fig. 19 is a view similar to Fig. 16 with the two halves of the pulley in the relative positions of Fig. 18.

In the modification of Figs. 13, 14 and 15, there is substituted for the split pulley on the traverse cam shaft 21 a cam cylinder 70, keyed or otherwise detachably tight on the shaft 21 and having a cam groove 71 of slight pitch on its periphery. A ring gear 72 loosely fits around cam cylinder 70 and is connected thereto by three pins 74 which loosely enter the cam groove 71. In place of the pulley 60 in the shaft of the package drive roll, there is substituted a detachable gear 78, meshing with the ring gear 72. In this embodiment, there is a frictional drive between the cam cylinder 70 and the ring gear 72; a slippage occurs between these parts, and as the cam cylinder moves slowly ahead of the ring gear the cam groove 71 reacts on the pins 74 to shift the ring gear axially to the left and right in Figs. 14 and 15. Referring now to Fig. 15, the teeth on the meshing ring gear 72 and gear 78 are somewhat inclined to the axes of these gears. Therefore, an axial shift of the ring gear in one direction accelerates the gear 78 while a shift in the opposite direction retards the gear 78, thus disrupting ribbon wind.

In the modification of Figs. 16 to 19 inclusive, the traverse cam shaft 21 carries two half pulleys 53ᶜ and 54ᶜ, either one of which is loose on the shaft and the other one of which is detachably keyed or otherwise detachably secured tightly on the shaft, these two half pulleys together forming a generally crown-shaped rim. The package drive roll shaft carries a crown pulley 60ᶜ, and a plain belt 55ᶜ runs on the two pulleys. Each of the two halves 53ᶜ and 54ᶜ is formed at its rim with a plurality of flattened portions 80. The tight one of the two halves, for example left half 54ᶜ, frictionally drives the belt 55ᶜ, which in turn rotates the loose half, for example half 53ᶜ. The slippage between the tight half and the belt thus results in a continual slow change in angular position of the tight and loose halves of the pulley. When, as in Figs. 16 and 17, the flattened places 80 on the two halves are out of correspondence (i. e. do not match), the effective periphery of the combined pulley is at its maximum. On the other hand, when the flattened portions of the two halves come into correspondence or matching relation, as in Figs. 18 and 19, the effective periphery of the combined pulley is at its minimum. The continual change in effective periphery of the combined pulley results in a continual slight change in speed of the package drive roll, which prevents ribbon wind.

While in the foregoing example of mechanism for breaking up ribbon wind, the traverse cam shaft is shown as equipped with the mechanism which introduces the slippage and changes the speed ratio of the connection between the cam shaft and package drive roll, obviously such mechanism can be applied to the package roll shaft. That is, for example, in Fig. 1, the split pulley having the described speed-changing characteristics can be applied in place of the plain V-pulley 60, and a plain V-pulley be applied to the traverse cam shaft. The same interchange of position of the elements can be made in each of the modifications. However, since it is desired to use a relatively large pulley or gear on the traverse cam shaft and a relatively small pulley or gear on the package drive roll shaft, it is advantageous to locate the speed-changing pulley or ring gear on the traverse cam shaft where it can advantageously have a relatively large diameter, and to locate the simple pulley or gear on the package roll shaft where it can advantageously have a small diameter.

All of the several described embodiments have an advantageous feature of ease of adjustment of the mean speed ratio between the traverse cam and the package drive roll. When it is desired to alter this mean speed ratio to wind a package of different pitch of winding, this can be done easily by merely detaching one or both of the pulleys, or both of the gears of Figs. 13 to 15, and replacing each detached pulley or gear with a similar one of different diameter. Neither the motor nor the motor speed need be changed in effecting this change in the pitch of winding, and the traverse cam need not be disturbed or changed except when it is desired to replace the cam by one of different profile. It will be noticed that the possibility of changing the speed of winding and the winding pitch by a simple change of one of the pulleys or a pair of the gears renders it possible to produce a wide range of patterns of winding on the unit with the same cam profile and motor speed.

A further feature of each of the several embodiments of the invention is that the devices for preventing ribbon wind are effective on each of the several winding units of the machine both while traveling and also while stationary, so that when desired the traveling movement of the units can be stopped and the units left winding without the occurrence of ribbon wind on any of them.

I claim:

1. A winding unit having therein a package driving device and a traverse device, means for driving one of said devices and a driving connection between said devices for breaking up ribbon wind, said connection including cooperating frictional driving and driven elements, the driven element slipping relatively behind the driving element as the driving element drives the driven element and means operated by the relative slip between said frictional driving and driven elements to vary the speed ratio of the said driving connection.

2. A winding unit having therein a package driving device and a traverse device, means for driving one of said devices and a driving connection between said devices for breaking up ribbon wind, said connection including cooperating frictional driving and driven elements, the driven element slipping relatively behind the driving element as the driving element drives the driven element, and cam means for varying the speed ratio of the driving connection, and means responsive to the relative slip between said friction driving and driven elements for controlling the operation of said cam means.

3. A winding unit having therein a package driving device and a traverse device, means for driving one of said devices and a driving connection between said devices for breaking up ribbon wind, said connection including a pulley having a variable effective diameter and including two elements, means for driving one of said elements frictionally from the other element so as to cause a slip, and means governed by said rotary slip of one of the said elements behind the other for varying the effective diameter of the pulley.

4. A winding unit having therein a package driving device and a traverse device, means for driving one of said devices and a variable speed connection between said devices, the unit including a driving element and a driven element frictionally operated by the driving element with resulting slip between them, the said variable speed connection including discontinuous surfaces on the peripheries of both said driving and driven elements adapted to be brought alternately into correspondence and into non-correspondence by the relative slip between said elements, thereby to vary the effective diameter of the combined peripheries of said driving and driven elements.

5. A winding unit having therein a package driving device and a traverse device, means for driving one of said devices, and a driving connection between said devices for breaking up ribbon wind, said connection including intermeshing gears of which the teeth are at an angle to the axes of rotation of the gears, means for frictionally driving one of said gears, and means operated by the slip occurring in said frictional driving to cause a shift of one of the gears, such as to vary the speed ratio between said devices.

6. A winding unit having therein a package driving device and a traverse device, means for driving one of said devices, and a driving connection between said devices for breaking up ribbon wind, said connection including intermeshing gears of which the teeth are at an angle to the axes of rotation of the gears, means for frictionally driving one of said gears, and a cam effective as a consequence of the slip occurring in said frictional driving to cause a shift of one of the gears, such as to vary the speed ratio between said devices.

7. A winding machine having therein a package driving device and a traverse device, means for driving one of said devices, and a variable speed connection between said devices, the machine including cooperating elements one of which is located externally of the other and one of which drives the other, the said elements fitting each other loosely, and the machine including means actuated by difference in angular velocity between said loosely fitting elements for causing the variable speed connection alternately to increase and decrease the speed ratio between the traverse device and the package driving device.

8. A winding machine having therein a package driving device and a traverse device, means for driving one of said devices, cooperating elements one of which is located externally of the other and one of which is adapted to drive the other with resulting slip, the said elements fitting each other loosely, a cam follower on one of said elements and a cooperating cam on the other of said elements having a path such that difference in angular velocity between said elements shifts one of said elements axially back and forth with respect to the other said element, the machine having therein a speed-changing connection between the package driving device and the traverse device including inclined teeth on said axially movable element and a gear meshing with said teeth, whereby axial movement of said axially movable element alternately increases and decreases the speed ratio between the traverse device and the package driving device.

9. In a winding machine, the combination of cooperating rotary elements one of which is located externally of the other, the said elements fitting each other loosely, a cam follower on one of said rotary elements, and a cooperating cam on the other one of said elements, the cam having a path such that difference in angular velocity between said elements shifts one of said elements back and forth axially with respect to the other element.

10. A winding machine having therein a package driving device and a traverse device, means for driving one of said devices, and a variable speed connection between said devices including a pulley of variable effective diameter, the machine including a driving element and a driven element frictionally operated by the driving element with resulting slip of the driven element behind the driving element as the driving element drives the driven element, and means actuated by the relative slip between said driving and driven elements for alternately increasing and decreasing the effective diameter of said pulley.

11. A winding unit having therein a package driving device and a traverse device, means for driving one of said devices, frictionally associated elements in the unit, one of said frictionally associated elements being adapted to be driven by the other with resulting slip of the driven element behind the driving element as the driving element drives the driven element, a driving connection between the traverse device and the package driving device including a two-part pulley, and cam and cam follower means for varying the relation between the parts of the pulley, said cam and cam follower means being responsive to slip between the said frictionally associated elements.

12. A winding unit having therein a package driving device and a traverse device, means for driving one of said devices, a connection between said devices including a pair of gears acting to transmit driving force, means for alternately advancing and retarding the angular movement of rotation of one of said gears with respect to the angular movement of rotation of the other of said gears, the unit including driving and driven elements which slip with relation to each other, and means responsive to said slip for actuating said advancing and retarding means.

13. A winding unit having therein a package driving device and a traverse device, means for driving one of said devices and a variable speed connection between said devices, the variable speed connection including a belt and two pulleys, one of said pulleys having two parts each having its periphery in the form of a series of discontinuous surfaces, and means for alternately bringing the parts of the two-part pulley into angular relations such that their surfaces match and then do not match, to vary the effective diameter of said two-part pulley, and accordingly the speed ratio between the traverse device and package driving device.

14. A traveling unit winding machine having therein a plurality of winding units each including a winding package drive roll and a traverse device, traveling with the unit, the machine including means for causing the several units to travel in a path having straight and curved portions and means for supplying driving power to the several units to operate them to wind during said travel, and each of said units having therein a variable speed connection between the traverse device and the winding package drive roll and means for automatically varying the speed ratio of said connection during winding, to break up ribbon wind.

15. A traveling unit winding machine having therein a plurality of winding units each including a winding package drive roll and a traverse device, traveling with the unit, the machine including means for causing the several units to travel in a path having straight and curved portions and means for supplying driving power to the several units to operate them to wind during said travel, and each of said units having therein a variable speed connection between the traverse device and the winding package drive roll and means contained by the traveling unit and operable independently of travel thereof for automatically varying the speed ratio of said connection during winding, to break up ribbon wind.

16. A winding machine having therein a plurality of flexibly connected traveling units each including a winding means and a quick-traverse means associated therewith, means for causing the units to travel in a path during winding, each unit including a means for disrupting synchronism between the traversing mechanism and winding means of the unit, each said synchronism-disrupting means consisting wholly of mechanism carried by its traveling unit.

17. A traveling unit winding machine having therein a plurality of winding units each including a winding package drive roll and a traverse device, traveling with the unit, the machine including means for causing the several units to travel in a path having straight and curved portions and means for supplying driving power to the several units to operate them to wind during said travel, and each of said units having therein a driving element and a driven element cooperating frictionally with the driving element with resulting slippage and means operating as a consequence of said slippage to vary the ratio between the speeds of the package drive roll and the traverse device.

18. A cone winding unit for traveling spindle winders, having therein a cone holder and a roll on which the winding-cone is adapted to rest during winding, the said roll including a winding-cone driving portion and a loose element rotatable with respect to the winding-cone driving portion and adapted to support the tip portion of the cone, a traverse cam, a motor for rotating the cam during travel of the unit and a driving connection between the cam and the cone-driving portion of said roll.

19. A traveling unit cone-winding machine having therein a plurality of winding units, means for causing the units to travel in a path, each unit including a traverse device, means for holding a winding cone package, a rotary package driving roll having driving contact with less than the entire length of the winding cone, a loose element rotatable with respect to the cone-driving portion of the roll and adapted to support the tip portion of the cone during winding, and a driving connection between the traverse device and the roll.

20. A traveling spindle winder having therein a plurality of movable winding units each of which includes: a package driving roll on which the winding package is adapted to rest during winding, a traverse cam which determines the traversing throw of the strand winding on the package, a motor connected to drive the traverse cam at approximately constant speed and a driving connection between the shaft of the cam and the package driving roll comprising at least one detachable part to permit change therein, thereby to permit different winding speeds with the same traverse cam and motor speed.

21. A traveling spindle winder having therein a plurality of movable winding units each of which includes: a package driving roll on which the winding package is adapted to rest during winding, a traverse cam which determines the traversing throw of the strand winding on the package, a motor connected to drive the traverse cam at approximately constant speed and a driving connection between the shaft of the cam and the package driving roll comprising pulleys associated respectively with the cam and roll and a belt connecting the pulleys, at least one of the pulleys being detachable to permit substitution of a pulley of different diameter thereby to permit different winding speeds with the same traverse cam and motor speed.

22. A traveling spindle winder having therein a plurality of movable winding units each of which includes: a package driving roll on which the winding package is adapted to rest during winding, a traverse cam which determines the traversing throw of the strand winding on the package, a traverse cam shaft, a motor connected to drive the traverse cam at approximately constant speed and a belt and pulley connection between the shaft of the traverse cam and the package driving roll.

23. A traveling spindle winder having therein a plurality of movable winding units each of which includes: a package driving roll on which the winding package is adapted to rest during winding, a traverse cam which determines the traversing throw of the strand winding on the package, a motor connected to drive the traverse cam at approximately constant speed and a driving connection between the shaft of the cam and the package driving roll comprising gears associated with the cam and roll, said gears being detachable to permit substitution of gears of different sizes, thereby to permit different winding speeds with the same traverse cam and motor speed.

24. A traveling unit winding machine having therein a plurality of winding units each including a winding package drive roll and a traverse device, traveling with the unit, the machine including means for causing the several units to travel in a path having straight and curved portions, and means for supplying power to the several units to operate them to wind during said travel, and each of said units having therein a variable speed connection between the traverse device and the winding package drive roll including intermeshing gears having teeth inclined to their axes and means for automatically shifting one of said gears with relation to the other gear during winding, to break up ribbon wind.

25. A traveling unit cone-winding machine having therein a plurality of winding units, means for causing the units to travel in a path, each unit including a traverse device, means for holding a winding cone package, a rotary package driving roll having driving contact with less than the entire length of the winding cone, a loose element rotatable with respect to the cone-driving portion of the roll and adapted to support the tip portion of the cone during winding, a variable speed driving connection between the traverse device and the roll and means for automatically varying the speed ratio of said driving connection during winding to break up ribbon wind.

EDWARD J. ABBOTT.